(No Model.) 2 Sheets—Sheet 1.
F. E. BREED.
STAIR AND FLOOR TRUCK.
No. 554,359. Patented Feb. 11, 1896.
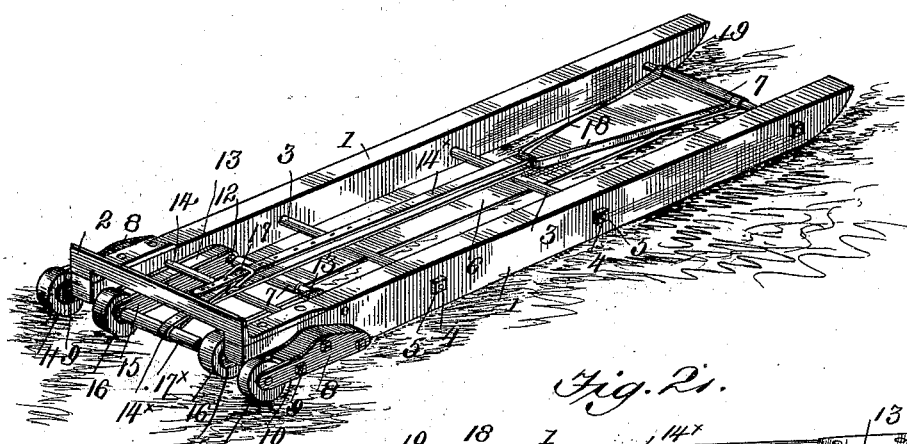
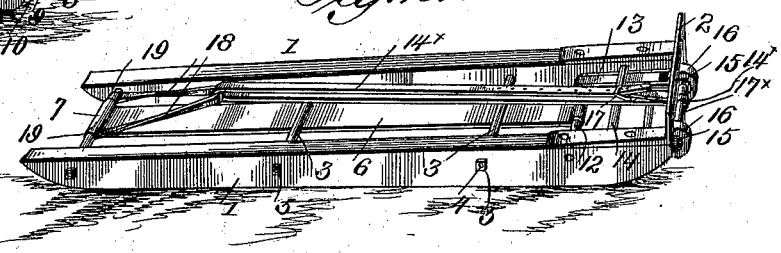
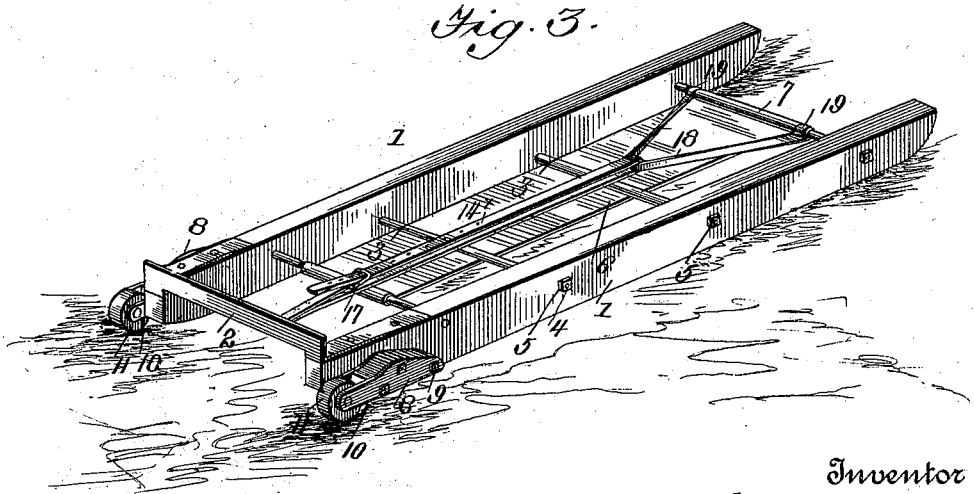
Witnesses:
Inventor
Franklin Emmett Breed
by
Harris & Baldwin
Attorneys (No Model.) 2 Sheets—Sheet 2.

F. E. BREED.
STAIR AND FLOOR TRUCK.

No. 554,359. Patented Feb. 11, 1896.

Witnesses
John Imrie
S. A. Baldwin

Inventor
Franklin Emmett Breed
by
Harris & Baldwin
Attorneys

UNITED STATES PATENT OFFICE.

FRANKLIN EMMETT BREED, OF JAMESTOWN, NEW YORK, ASSIGNOR OF ONE-HALF TO CHARLES HERMAN BREED.

STAIR AND FLOOR TRUCK.

SPECIFICATION forming part of Letters Patent No. 554,359, dated February 11, 1896.

Application filed May 23, 1895. Serial No. 550,325. (No model.)

*To all whom it may concern:*

Be it known that I, FRANKLIN EMMETT BREED, a citizen of the United States, residing in Jamestown, in the county of Chautauqua and State of New York, have invented certain new and useful Improvements in Stair and Floor Trucks; and I hereby declare that the following is a full and exact description of the invention, which will enable others skilled in the art to which it appertains to make and use the same.

The object of my invention is to construct a strong and durable floor and stair truck adapted to house, store and truckmen's use; and the improvement consists in the construction and arrangement of the parts, as will be fully understood by this specification and the accompanying drawings, in which—

Figure 4:
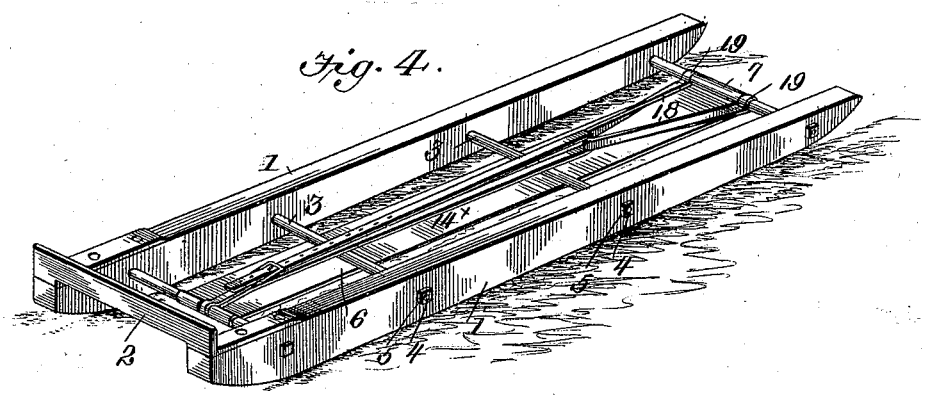
Figure 5:
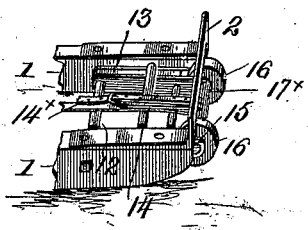
Figure 6:
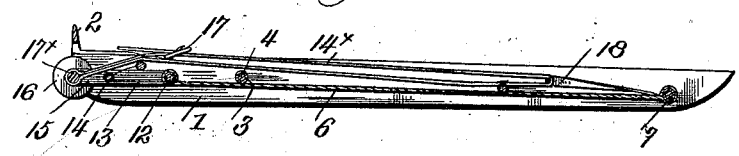
Figure 7:
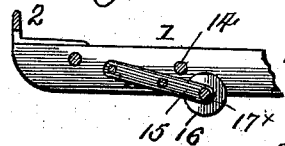

Figure 1 shows a truck embodying my improvements. Fig. 2 shows a truck with outside wheels left off. Fig. 3 shows a truck with the inner wheels left off. Fig. 4 shows a truck with all wheels off, as used for a skid. Fig. 5 is a perspective view of one end. Fig. 6 shows a longitudinal section; Fig. 7, a sectional view showing inner wheels turned back.

In the drawings, 1 1 are side pieces for my truck, preferably made of hard wood and heavy enough for the strength required, the ends of each side being rounded up similar to a sled-runner.

2 is a heavy metal cross-bar, and serves the purpose of holding the sides together and acting as a stop to hold things on the truck.

3 3 are iron tubes holding the sides at the desired distance apart and having bolts 4 4 running through them, and are held in place by nuts 5 5.

6 is a wide metal plate extending nearly the length of the truck and is securely fastened to the rounds at 7 7.

8 8 are stationary blocks securely bolted to the outside front end of the truck and have securely mounted at their front ends the truck-wheels 11 11.

12 is a rod across the truck, near the front end, on which are movably mounted arms 13 13, which arms are provided at their other ends with wheels 16 16. These arms can be swung back when desired, as shown in Fig. 7, giving better bearing for heavy loads and allows much less weight to rest on the rear end.

17 is a heavy leather strap secured to the front round of the truck for the purpose of drawing the truck.

18 is a shorter heavy leather strap secured to the rear round of the truck for the purpose of holding back when going downstairs and also guiding the rear end of the truck. These straps while seemingly very simple, yet are a great help in the ease of moving and controlling the truck. Of course ropes might be used in place of the leather straps, but they would not be as durable and convenient. The wide metal plate 6 is used mostly when the truck is turned over and used as a skid for the purpose of sliding barrels and such things into cellars or off from wagons, and when so used the wheels of the truck are not essential.

Having fully described my invention, what I claim as new, and desire to secure by Letters Patent, is—

1. In floor and stair trucks, the side pieces of the frame beveled upward at each end, the sides being provided at their lower end with outside blocks securely fastened thereto, having wheels mounted at the end of said blocks, the sides provided with hinged arms and carrying wheels between the sides, a metal stop and suitable bolt connections for holding the truck together, in combination with a heavy metal plate running parallel to the sides and midway between the same and secured to the bolt connections, the bolts being provided with straps at each end of the truck for drawing or guiding the same as shown and set forth.

2. In floor and stair trucks, sides 1, 1, made as shown and connected by metal plate 2, tubes 3, 3, and rods 4, 4, the sides having stationary blocks at the outside lower end and carrying wheels 11, 11, and inside swinging arms 13, 13, provided with wheels 16, 16, in combination with heavy metal plate 6, secured to rounds 7, 7, and straps securely fastened on the rounds at each end of the truck for the purpose of drawing and guiding the same, substantially as shown and for the purpose set forth.

In testimony whereof I hereby affix my signature in presence of two witnesses.

FRANKLIN EMMETT BREED.

Witnesses:
MILO HARRIS,
N. E. THOMAS.